US009187240B2

(12) United States Patent
Hobson et al.

(10) Patent No.: US 9,187,240 B2
(45) **Date of Patent: *Nov. 17, 2015**

(54) DISPOSABLE PROCESSING BAG WITH ALIGNMENT FEATURE

(71) Applicant: EMD Millipore Corporation, Billerica, MA (US)

(72) Inventors: James Hobson, Burleson, TX (US); James Austin, Fort Worth, TX (US); Boris Pesakovich, Brookline, MA (US); Elias G. Noukas, Burlington, MA (US); Thomas Janko, Stoneham, MA (US); Shaun McMahon, Dublin, NH (US)

(73) Assignee: EMD Millipore Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/191,499

(22) Filed: Feb. 27, 2014

(65) Prior Publication Data

US 2014/0173876 A1 Jun. 26, 2014

Related U.S. Application Data

(62) Division of application No. 12/079,233, filed on Mar. 25, 2008, now Pat. No. 9,090,398.

(60) Provisional application No. 60/927,598, filed on May 4, 2007.

(51) Int. Cl.

| | |
|---|---|
| ***B65D 5/36*** | (2006.01) |
| ***B65D 3/00*** | (2006.01) |
| ***F16L 3/08*** | (2006.01) |
| ***B65B 67/12*** | (2006.01) |
| ***B65F 1/06*** | (2006.01) |
| ***B65D 88/20*** | (2006.01) |
| *B65B 69/00* | (2006.01) |
| *B65D 90/04* | (2006.01) |

(52) U.S. Cl.

CPC . *B65F 1/06* (2013.01); *B65D 88/20* (2013.01); *B65B 69/0091* (2013.01); *B65D 90/046* (2013.01); *B65D 2203/10* (2013.01); *B65D 2303/00* (2013.01); *Y10T 29/49826* (2015.01)

(58) Field of Classification Search

CPC .................................................... B65D 77/061
USPC ................ 383/2, 33, 77, 67, 121.1, 906, 119; 248/65, 95, 56; 229/117.3, 117.35

See application file for complete search history.

(56) References Cited

U.S. PATENT DOCUMENTS

| | | | |
|---|---|---|---|
| 3,372,725 | A | 3/1968 | Voorhees |
| 3,552,577 | A | 1/1971 | Latham, Jr. |

(Continued)

FOREIGN PATENT DOCUMENTS

| | | | |
|---|---|---|---|
| DE | 29923221 | U1 | 8/2000 |
| EP | 0825134 | A1 | 2/1998 |

(Continued)

OTHER PUBLICATIONS

Extended European Search Report received for EP Patent Application No. 08155091.5, mailed on Sep. 18, 2008, 6 pages.

(Continued)

*Primary Examiner* — Jes F Pascua
*Assistant Examiner* — Derek Battisti
(74) *Attorney, Agent, or Firm* — EMD Millipore Corporation

(57) ABSTRACT

The present invention is an alignment device for a bag containing one or more ports. The alignment device is attached to either the one or more ports or to the bag adjacent the one or more ports. The plate has an indicator or a unique outer edge shape that is designed to fit into a corresponding unique opening in a holder to ensure proper alignment of the bag and its port(s) in the holder. The plate is has a series of holes equal to and in alignment with the one or more ports of the bag and the port(s) extend through the holes of the plate.

11 Claims, 7 Drawing Sheets

(56) References Cited

U.S. PATENT DOCUMENTS

| | | | |
|---|---|---|---|
| 3,623,629 A | 11/1971 | Hendershot | |
| 3,648,690 A | 3/1972 | Miller et al. | |
| 3,783,920 A | 1/1974 | Weikert | |
| 3,876,119 A | 4/1975 | Lamkin | |
| 3,931,834 A | 1/1976 | Caillet | |
| 4,013,558 A | 3/1977 | Rosenberg | |
| 4,226,280 A | 10/1980 | Hellouin de Cenival et al. | |
| 4,258,723 A | 3/1981 | McCue et al. | |
| 4,344,264 A | 8/1982 | Smith | |
| 4,397,406 A | 8/1983 | Croley | |
| 4,439,179 A | 3/1984 | Lueders et al. | |
| 4,461,402 A | 7/1984 | Fell et al. | |
| 4,516,692 A | 5/1985 | Croley | |
| 4,536,901 A | 8/1985 | Jones et al. | |
| 4,595,037 A | 6/1986 | LeBreton et al. | |
| 4,754,786 A | 7/1988 | Roberts | |
| 4,847,028 A | 7/1989 | Snyder et al. | |
| 4,850,506 A | 7/1989 | Heaps, Jr. et al. | |
| 4,896,789 A | 1/1990 | Federspiel | |
| 5,064,096 A | 11/1991 | Illing et al. | |
| 5,145,499 A | 9/1992 | Dyson | |
| 5,145,735 A | 9/1992 | Deller et al. | |
| 5,156,295 A * | 10/1992 | Gordon et al. | 229/117.35 |
| 5,190,720 A | 3/1993 | Hunsbedt et al. | |
| 5,265,753 A | 11/1993 | Moorman | |
| 5,322,195 A | 6/1994 | Ellis | |
| 5,350,080 A | 9/1994 | Brown et al. | |
| 5,362,642 A | 11/1994 | Kern | |
| 5,368,073 A | 11/1994 | Murphy | |
| 5,375,733 A | 12/1994 | Kohler et al. | |
| 5,402,915 A | 4/1995 | Hogan | |
| 5,427,267 A | 6/1995 | Willman | |
| 5,465,436 A | 11/1995 | Bleicher | |
| 5,484,079 A | 1/1996 | Carter et al. | |
| 5,497,912 A | 3/1996 | Hoback et al. | |
| 5,505,327 A | 4/1996 | Witt | |
| 5,531,360 A | 7/1996 | Berdel et al. | |
| 5,564,829 A | 10/1996 | Lafond | |
| 5,673,818 A | 10/1997 | Kaneski et al. | |
| 5,687,993 A | 11/1997 | Brim | |
| 5,799,830 A | 9/1998 | Carroll et al. | |
| 5,803,888 A | 9/1998 | Severs et al. | |
| 5,810,202 A | 9/1998 | Hoback et al. | |
| 5,816,431 A | 10/1998 | Giannopoulos | |
| 5,836,363 A | 11/1998 | LaFleur | |
| 5,941,635 A | 8/1999 | Stewart | |
| 5,944,251 A | 8/1999 | LaFleur | |
| 6,032,818 A | 3/2000 | Olson | |
| 6,071,005 A | 6/2000 | Ekambaram et al. | |
| 6,076,457 A | 6/2000 | Vallot | |
| 6,086,574 A | 7/2000 | Carroll et al. | |
| 6,186,932 B1 | 2/2001 | Vallot | |
| 6,190,913 B1 | 2/2001 | Singh | |
| 6,273,332 B1 * | 8/2001 | Todjar-Hengami | 229/129.1 |
| 6,286,700 B1 | 9/2001 | Davidson | |
| 6,299,437 B1 | 10/2001 | Bonerb et al. | |
| D452,135 S * | 12/2001 | Wyatt et al. | D8/354 |
| 6,347,886 B1 | 2/2002 | Willemstyn | |
| 6,398,053 B1 | 6/2002 | Thornsen | |
| 6,450,215 B1 | 9/2002 | Willemstyn et al. | |
| 6,481,598 B1 | 11/2002 | Thornsen | |
| 6,505,524 B1 | 1/2003 | Silvis | |
| 6,682,108 B1 | 1/2004 | Arch | |
| 6,758,593 B1 | 7/2004 | Terentiev | |
| 6,773,385 B2 | 8/2004 | Johnson et al. | |
| 6,844,186 B2 | 1/2005 | Carll | |
| 6,942,123 B2 | 9/2005 | Wertenberger | |
| 6,955,701 B2 | 10/2005 | Schrage | |
| 6,981,794 B2 | 1/2006 | Bibbo et al. | |
| 6,988,639 B2 | 1/2006 | Arch | |
| 7,004,196 B2 | 2/2006 | Schubmehl et al. | |
| 7,073,670 B2 | 7/2006 | Fall et al. | |
| 7,077,559 B2 | 7/2006 | Hlavinka et al. | |
| 7,086,778 B2 | 8/2006 | Terentiev | |
| 7,087,160 B2 | 8/2006 | Beer et al. | |
| 7,117,653 B2 | 10/2006 | Yakushigawa et al. | |
| 7,140,516 B2 | 11/2006 | Bothor et al. | |
| 7,153,021 B2 | 12/2006 | Goodwin et al. | |
| 7,476,265 B2 | 1/2009 | Firman | |
| 7,528,712 B2 | 5/2009 | Hong et al. | |
| 7,644,902 B1 * | 1/2010 | Julian et al. | 248/313 |
| 7,658,286 B2 * | 2/2010 | Murray | 206/459.1 |
| 7,740,212 B2 * | 6/2010 | Austin et al. | 248/95 |
| 2003/0011194 A1 | 1/2003 | Arch | |
| 2003/0077466 A1 | 4/2003 | Smith et al. | |
| 2003/0166442 A1 | 9/2003 | Johnson et al. | |
| 2004/0027912 A1 | 2/2004 | Bibbo et al. | |
| 2004/0074922 A1 * | 4/2004 | Bothor et al. | 222/105 |
| 2004/0261889 A1 | 12/2004 | Elgan et al. | |
| 2005/0040063 A1 | 2/2005 | Churvis et al. | |
| 2005/0063247 A1 | 3/2005 | Krause | |
| 2005/0063250 A1 | 3/2005 | Hubbard | |
| 2005/0158615 A1 | 7/2005 | Samuel et al. | |
| 2005/0163667 A1 | 7/2005 | Krause | |
| 2005/0178768 A1 | 8/2005 | Woollen, Jr. | |
| 2005/0218075 A1 | 10/2005 | Graetz et al. | |
| 2005/0249033 A1 | 11/2005 | Krause | |
| 2005/0272146 A1 | 12/2005 | Hodge et al. | |
| 2005/0281132 A1 | 12/2005 | Armstrong et al. | |
| 2006/0028909 A1 | 2/2006 | Behague | |
| 2006/0061009 A1 | 3/2006 | Clack | |
| 2006/0065310 A1 | 3/2006 | West et al. | |
| 2006/0086741 A1 | 4/2006 | Bacon et al. | |
| 2006/0114744 A1 | 6/2006 | White et al. | |
| 2006/0176772 A1 | 8/2006 | Goodwin et al. | |
| 2006/0196501 A1 | 9/2006 | Bibbo et al. | |
| 2006/0270036 A1 | 11/2006 | Goodwin et al. | |
| 2006/0280028 A1 | 12/2006 | West et al. | |
| 2007/0064519 A1 * | 3/2007 | Neumann | 366/136 |
| 2008/0006636 A1 * | 1/2008 | Wild et al. | 220/495.06 |
| 2008/0310768 A1 * | 12/2008 | Hobson et al. | 383/33 |
| 2009/0188211 A1 | 7/2009 | Galliher et al. | |
| 2011/0041952 A1 | 2/2011 | Gaultney | |

FOREIGN PATENT DOCUMENTS

| | | | |
|---|---|---|---|
| EP | 1101712 | A1 | 5/2001 |
| EP | 1127806 | A1 | 8/2001 |
| EP | 1739165 | A1 | 1/2007 |
| GB | 1300629 | A | 12/1972 |
| GB | 1511729 | A | 5/1978 |
| GB | 2121361 | A | 12/1983 |
| GB | 2315483 | A | 2/1998 |
| JP | 56-19157 | U | 2/1981 |
| JP | 60-7273 | A | 1/1985 |
| JP | 63-129546 | U | 8/1988 |
| JP | 2006-321523 | A | 11/2006 |
| WO | 91/06490 | A1 | 5/1991 |
| WO | 94/15864 | A1 | 7/1994 |
| WO | 94/25252 | A1 | 11/1994 |
| WO | 9501925 | A1 | 1/1995 |
| WO | 9739824 | A1 | 10/1997 |
| WO | 0231372 | A1 | 4/2002 |
| WO | 0241484 | A2 | 5/2002 |
| WO | 03018170 | A1 | 3/2003 |
| WO | 03090795 | A1 | 11/2003 |
| WO | 2004087320 | A2 | 10/2004 |
| WO | 2005118771 | A2 | 12/2005 |
| WO | 2006002091 | A2 | 1/2006 |
| WO | 2006041541 | A1 | 4/2006 |
| WO | 2006116139 | A2 | 11/2006 |
| WO | 2007001173 | A2 | 1/2007 |

OTHER PUBLICATIONS

"Asymmetric", Available at: http://www.thefreedictionary.com/asymmetric, Retrieved on Mar. 4, 2014, 2 pages.

"Parallel", Available at: http://www.thefreedictionary.com/parallel, Retrieved on Mar. 4, 2014, 5 pages.

"Parallelogram", Available at: http://www.thefreedictionary.com/parallelogram, Retrieved on Mar. 4, 2014, 2 pages.

"Rhomboid", Available at: http://www.thefreedictionary.com/rhomboid, Retrieved on Mar. 4, 2014, 2 pages.

* cited by examiner

DISPOSABLE PROCESSING BAG WITH ALIGNMENT FEATURE

CROSS-REFERENCE RELATED APPLICATIONS

This application is Divisional application of U.S. patent application Ser. No. 12/079,233, filed on Mar. 25, 2008, which claims the benefit of U.S. Provisional Patent Application No. 60/927,598, filed on May 4, 2007, the entire contents of which are incorporated by reference herein.

The present invention relates to a bag for use in a holder, such as a vat or carboy, and arranging the bag in a proper alignment within the holder via an alignment feature attached to the bag. More particularly, it relates to a disposable bag for use in a holder, such as a vat or carboy, with the bag having one or ports and an alignment feature attached to the bag adjacent the one or more ports to properly orient the bag in its holder.

BACKGROUND OF THE INVENTION

Traditionally, products such as pharmaceuticals, biopharmaceuticals, enzymes, nutriceuticals and the like were processed in stainless steel containers. After use the steel containers had to be cleaned and sterilized. This often required the use of steam and/are caustics to accomplish this task.

Additionally, for regulated products such as pharmaceuticals, the sterilization process had to be validated to show that it could sterilize the device and could so time after time.

Both the cleaning process and the validation are time consuming and expensive and can't be varied without a new validation.

This has led to the use of single use, disposable plastic bags to store and process many of these products. These bags are provided sterile (generally gamma irradiated), do not require cleaning as they are disposed of after use and reduces the validation required by the user and/or shifts the validation to the bag supplier.

These bags contain one or more ports through which liquids, additives, product and the like are added or removed from the bag during processing.

These bags are generally placed into a holder such as steel plastic, fiberglass, graphite or other composite vat, tote or carboy to help hold the weight of the liquid and to protect the bag from rupture due to contact with other items on the manufacturing floor, These holders have an opening in their bottom portion through which the ports extend. As the port arrangements differ by bag type, manufacturer or customer requirement, the bottom of the holders generally have large rectangular or circular opening and a matching plate that has several openings in it through which the ports are arranged while supporting the bag bottom by the remainder of the plate.

The ports are generally unmarked and indistinguishable from each other. However their arrangement is critical to the use of the bag due the arrangement of inlets and outlets from the holder. Often, the bag is inserted wrongly (backward for example) and is only discovered when the bag is at least partially filled. This requires the removal of the liquid and either rearrangement of the bag in the holder so that the ports are properly aligned or the use of a new bag.

What is needed is a better means for properly arranging a bag in its holder.

SUMMARY OF THE INVENTION

The present invention is an alignment device for a bag containing one or more ports wherein the alignment device is attached to either the one or more ports such as by wire ties, clamps or cable ties or to the bag adjacent the one or more ports via adhesives or welding or molding such as overmolding. The plate has either an indicator or an unique outer edge shape that is designed to fit into a corresponding unique opening in a bag holder such as a carboy or tote to ensure proper alignment of the bag and its port(s) in the holder.

In one embodiment the plate formed of plastic has a series of holes equal to and in alignment with the one or more ports of the bag and the port(s) are extended through the holes of the plate and the plate is attached to the bag by retainers on the port(s) below the plate. Such retainers can be plastic cable ties, wire ties, tube clamps and the like.

Alternatively, the plate may be fitted over the port(s) and attached to the bag such as by thermal bonding or welding.

In another embodiment, the plate is overmolded to the bag or the bag is formed and molded to the plate.

The plate may have any unique design that ensures that the alignment of the bag in the holder is correct and cannot be reversed or incorrectly aligned. Such designs use a plate that is affixed to the bag or its port(s) in such a way that it cannot be realigned or moved out of register.

Such designs include but are not limited to plates having a permanent graphical representation as to the alignment or an asymmetrical design which corresponds to a similar opening in the holder.

In another embodiment, the plate has two parts, an inner asymmetric portion and symmetric outer portion selectively attachable to the inner asymmetric plate portion and is of a configuration to fit into a standard opening in a holder.

DETAILED DESCRIPTION OF THE INVENTION

Figure 1:
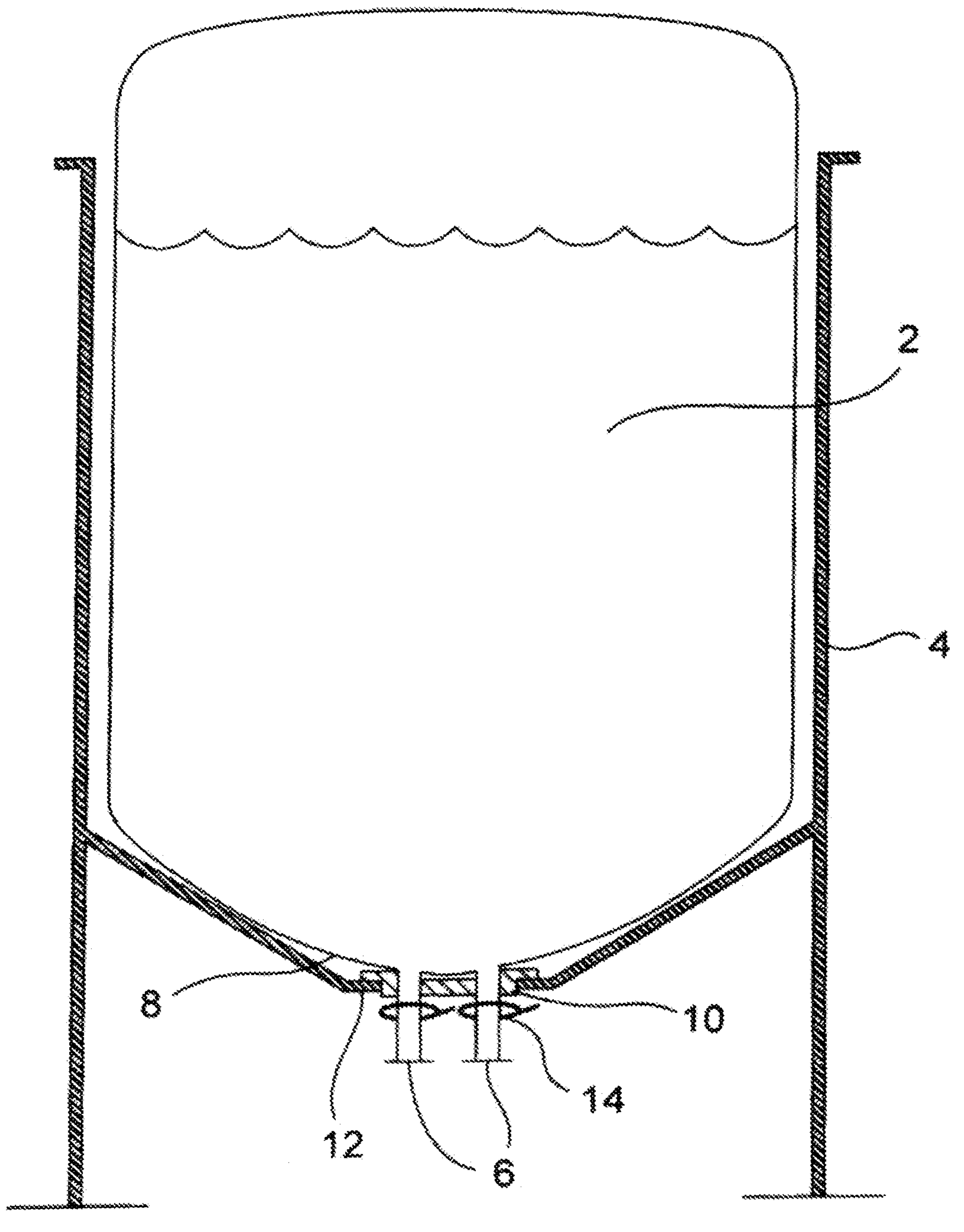
FIG. 1 shows a first embodiment of the present invention in cross-sectional view.

In FIG. 1 is shown a first embodiment of the present invention in cross-sectional view. A bag 2 is held within a holder 4 such as a carboy or a tote and has one or more ports 6 extending out at least of its lowermost portion 8. An alignment plate 10 is attached to either the bag 2 or its one or more ports 6 as will be discussed below. The plate 10 also provides support for the bottom of the bag while in use in the holder 4 by fitting into and aligning with a hole or opening 12 in the lowermost portion 8 of the holder 4. As can be seen, the port(s) 6 extend through the plate 10 so they may be connected to inlets, outlets, pumps, storage bags, tubing, etc (not shown) as is needed in the process. In this embodiment the plate 10 is attached to the ports 6 of the bag 2 by an attachment device 14 such as a cable tie or a wire wrap or similar device.

To the extent the same elements are used in later Figures, their reference numbers remain the same.

Figure 2:
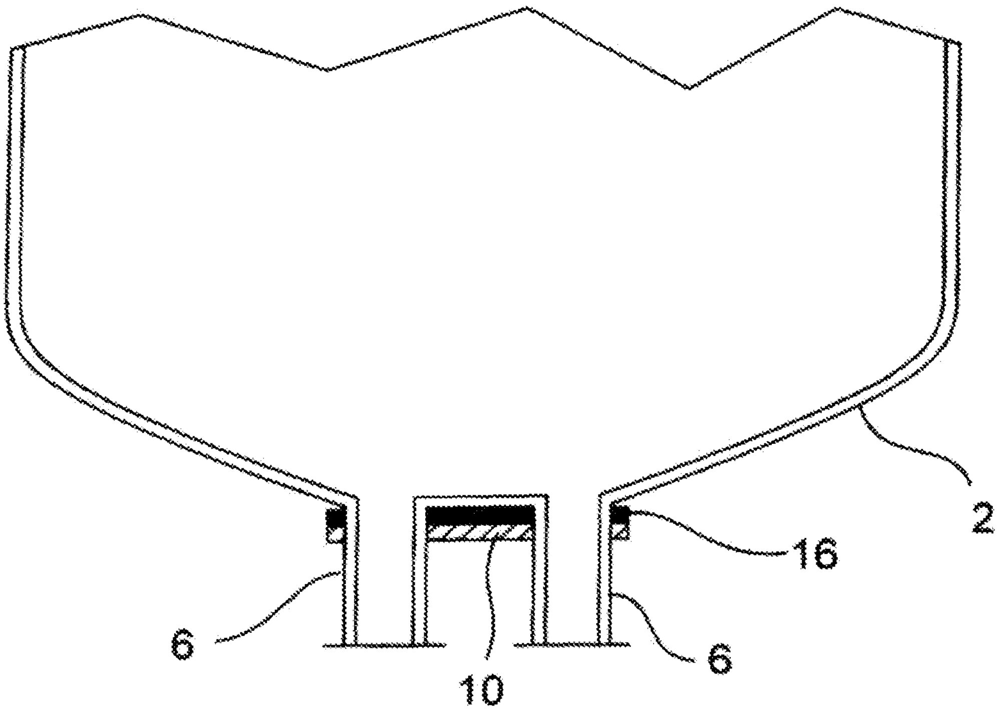
FIG. 2 shows a second embodiment of the present invention in planar, bottom view.

As shown in FIG. 2, one surface 16 of the plate 10 may be adhered or welded or molded to the bag 2 during assembly so that its orientation remains the same.

Figure 3:
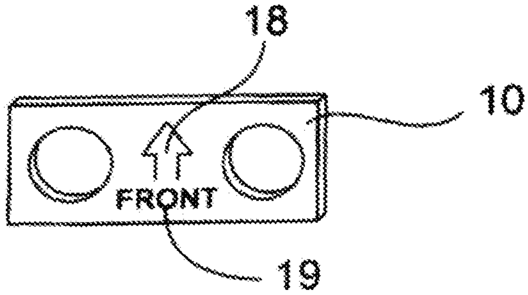
FIG. 3 shows a third embodiment of the present invention in cross-sectional view.

As shown in FIG. 3 is an embodiment of the plate containing a graphic design 18 as to the orientation or alignment of the bag 2 when it is inserted into the holder 4 such that the operator will know Which way to orient the bag 2 as it is being inserted into the holder 4 and attached to the various other elements such as pumps, filters, inlet hoses, outlet hoses, etc, not shown). The graphical design 18 may be anything such as an arrow as shown pointing in a given direction to indicate the bag's alignment to the holder 4. It may also include words 19 providing an indication of the direction of the hag, or which port is which such as inlet, outlet, etc so an operator may properly align the bag in the holder. Alternatively, the graphic design 18 could be a hash mark, the arrow mentioned above or other symbol that is designed to align with a similar feature on the holder 4 itself (not shown).

Figure 4:
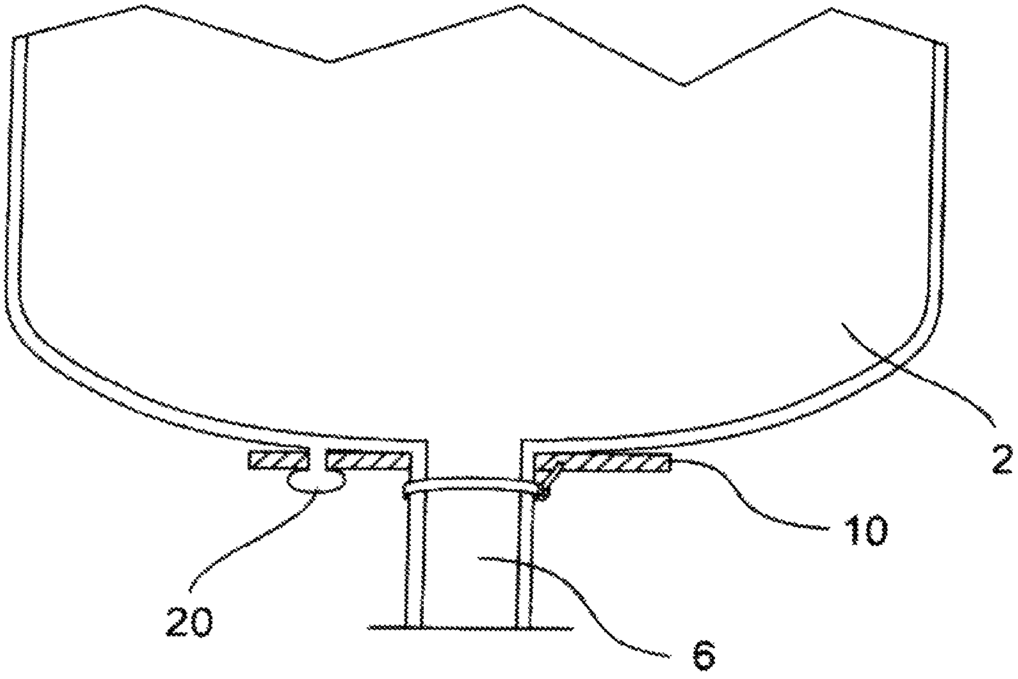
FIG. 4 shows a fourth embodiment of the present invention in cross-sectional view.

As shown in FIG. 4 is an embodiment in which the bag 2 has one port 6. In this embodiment the bat 2 also has an alignment device 20 in this case in the form of a nub that extends outwardly from the bag 2 and the alignment plate 10 contains both an opening for the port 6 but also for the alignment device 20 such that the plate 10 is always properly aligned to the bag and not allowed to rotate relative to it. The plate 10 may be attached to the port 6 in this instance by an attachment device 14 again in this instance a ratcheted cable tie. Other alignment devices include but are not limited to twist ties such as plastic coated wire ties, steel or plastic clamps and the like.

Bags 2 containing two or more ports 6 that extend through the plate 10 do not necessarily need a separate alignment device 20 but may have one if desired.

While the plate 10 in the above embodiments is shown as being a rectangle, the shape of the plate 10 and its corresponding hole 12 is not limited to such. It may be any symmetric, or asymmetric shape or design that is desired, such as any polygon including but not limited to triangles, squares, pentagons, hexagons, heptagons, octagons and the like. They may also be circular or ovals. They may also be combinations of the different shapes such as two circles of different sizes or two polygons of different sizes or different shapes.

Multiple plates 10 may also be used, with each one associated either with at least one port 6 or an alignment device 20.

Any of the embodiments discussed above may if desired contain the graphical design 18 discussed above.

Figure 5A:
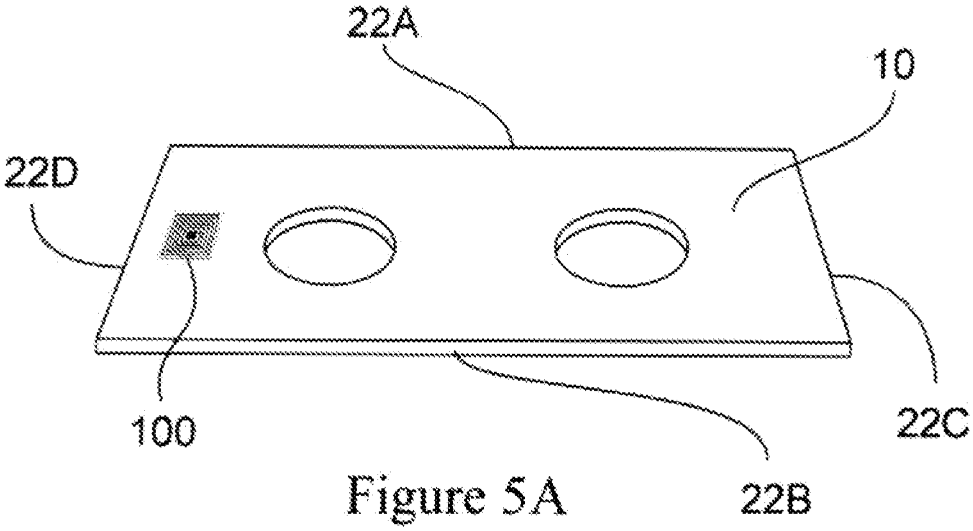
FIGS. 5A and B shows fifth embodiment of the present invention in planar view.
Figure 5B:
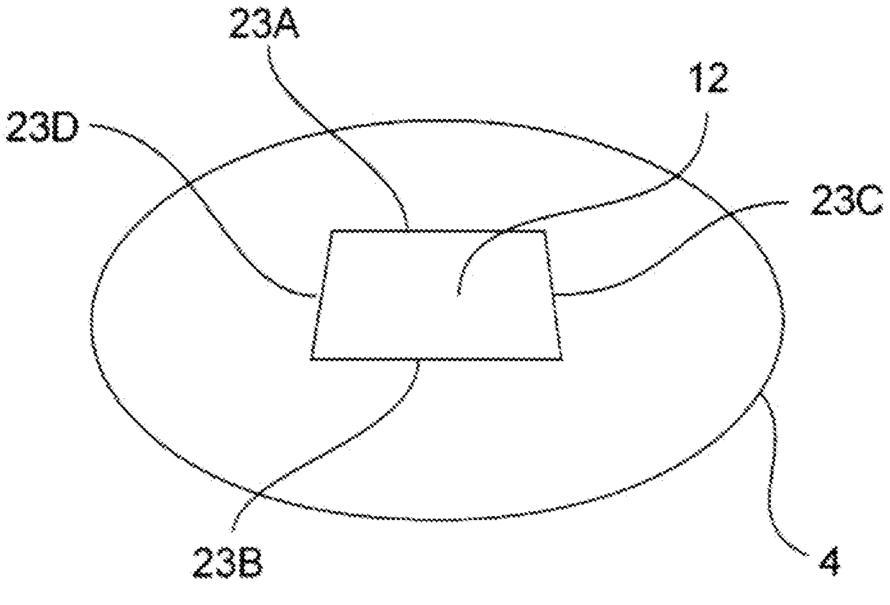

In FIG. 5A is shown a plate 10 the design of which is asymmetrical in shape and which corresponds to and sized to fit an asymmetrical opening 12 in the holder 4 as shown in FIG. 5B. In this instance, the plate 10 and opening 12 are in the shape of a four sided polygon having opposite first and second sides 22 A, B parallel to each other and a third and fourth sides 22 C,D parallel, to each other and intersecting the first and second sides 22 A, B at an angle of greater than 0 degree and less than 180 degree. In this way once the plate 10 is secured to the bag 2 such that it can not rotate either by attaching the plate 10 to the bag 2 itself or through the use of various multiple ports or the use of an alignment device 16 as discussed above, the bag 2 will only fit into the opening 12 in one orientation. As can be seen the opening 12 has corresponding, sides 23 A and B and 23 C and D to those respectively of sides 22A and B and 22 C and D.

Figure 6A:
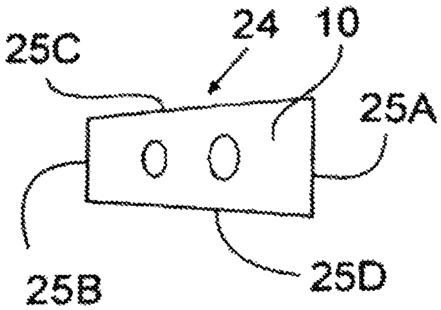
FIGS. 6A-H show different shapes useful in the embodiments of the present invention in planar view.
Figure 6B:
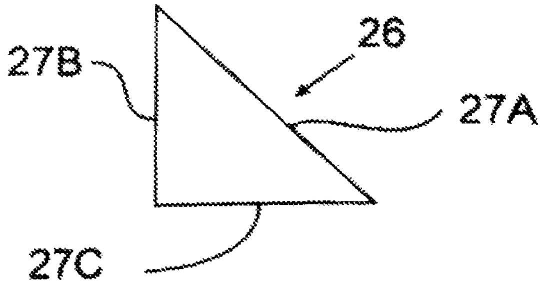
Figure 6C:
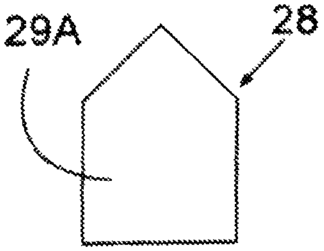
Figure 6D:
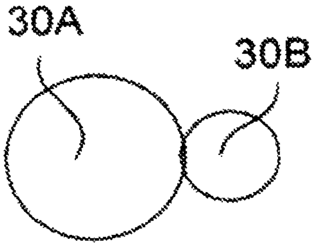
Figure 6E:
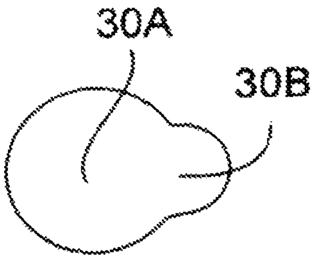
Figure 6F:
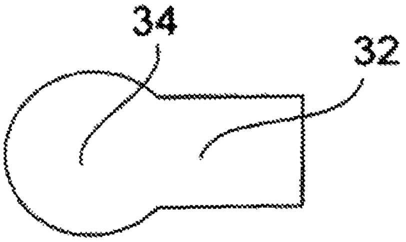
Figure 6G:
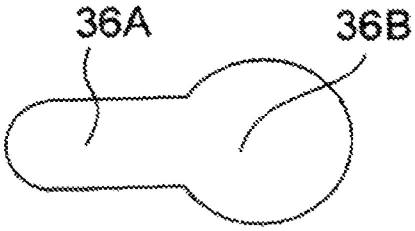
Figure 6H:
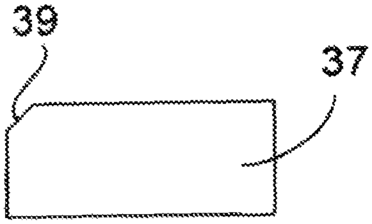

In FIGS. 6A-H are shown just a representative sampling of the possible asymmetrical plate 10 and corresponding opening 12 designs that can be used. Others will be well known and obvious to one of ordinary skill in the art and are meant to be included in the appended claims. FIG. 6A shows a polygon 24 having opposite first and second sides 25 A, B which are parallel to each other and a third and fourth sides 25 CD which are not parallel to each other and each of which intersect the first and second sides 25 A, B at an angle of greater than 0 degree and less than 180 degree. FIG. 6B shows a triangle 26 with at least one side 27A longer than the others 27 B,C. Essentially any triangle other than an isosceles triangle may be used. FIG. 6C, shows an asymmetrical pentagon 28 with at least side 29A being of a different length. Other asymmetrical polygonal shapes can also be used. FIG. 6D shows the use of two dissimilar circles 30 A, B attached at their adjacent surfaces. As shown in FIG. 6E the circles 30 A, B may only be partial. In FIG. 6F, the use of dissimilar shapes, in this instance a rectangle 32 coupled to a circle 34 is used. In FIG. 6G, the use of dissimilar ovals 36 A, B are used. FIG. 6H simple knocks one corner 39 of a rectangle 37 to loan a notch or key.

Figure 7A:
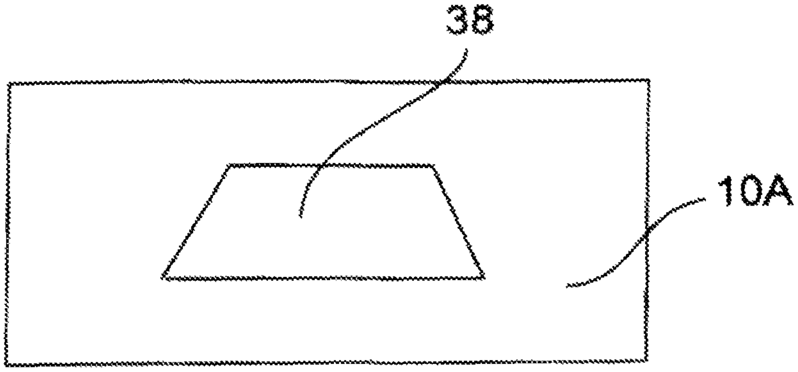
FIGS. 7A and B show another embodiment in planar bottom up view.
Figure 7B:
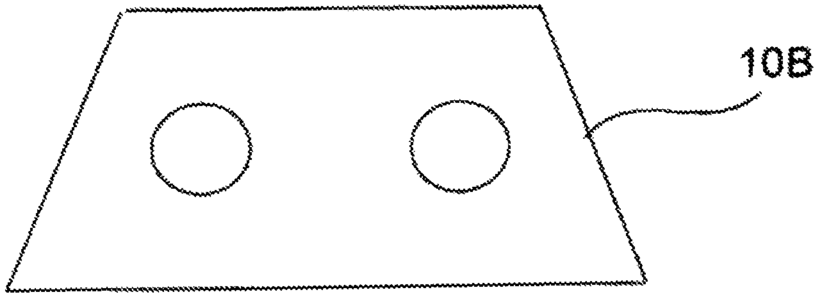

In some embodiments, as shown in FIG. 7A, it may be desirable to have a first plate portion 10A having a symmetrical outer shape that corresponds to the symmetrical shape of the opening 12 of the holder 4 (not shown) and an opening 38 of an asymmetrical shape such as any of those discussed above in the first plate portion 10A. A second plate portion 10B in FIG. 7B fits into the asymmetrical opening 38 of the first plate portion 10. In this manner a universal design can be made that allows for the orientation of the bag 2 in the plate 10 in the holder 4.

Figure 8:
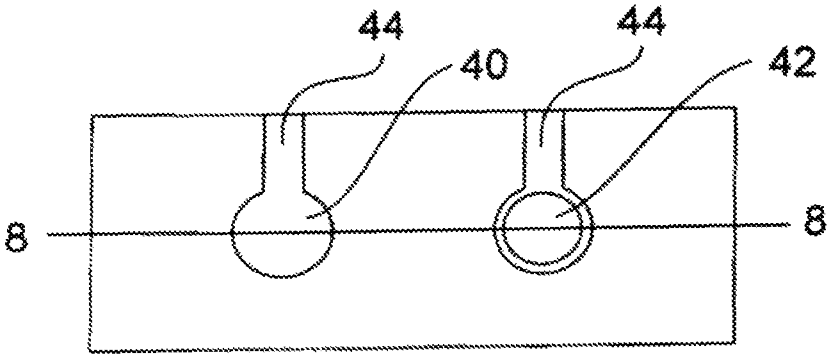
FIG. 8 shows a further embodiment in planar bottom up view.

As shown in FIG. 8 any of the plates 10 may also have a series of preformed holes 40 or holes containing knock out plugs 42 arranged in the most common positions in the plate 10 so that one plate may be used with a variety of bag/port designs. Additionally, channels 44 from the edge of the plate 10 to the holes 40 or knockout plugs 42 may be included with this or any other embodiment to allow one to squeeze the tubing adjacent the port(s) so as to allow one to fit the plate onto an existing bag.

Figure 9:
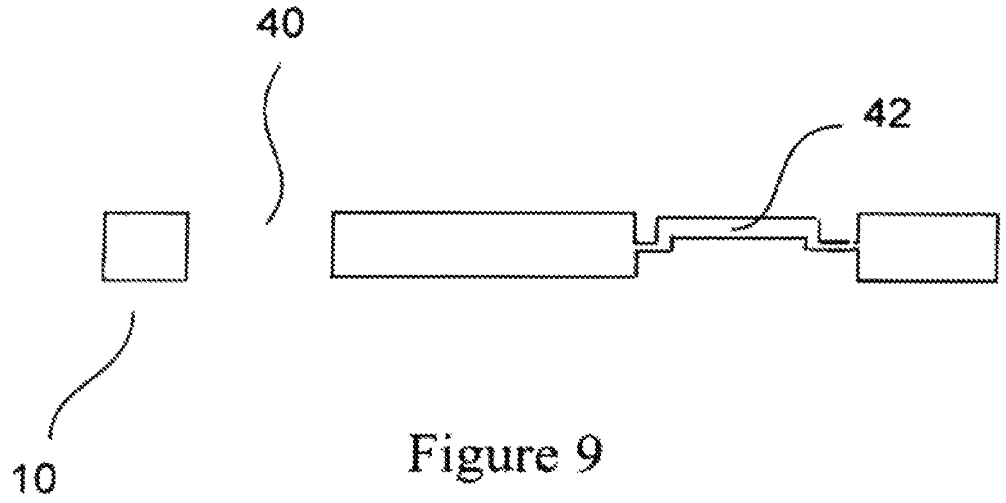
FIG. 9 shows a knockout plug according to an embodiment of the present invention in cross-sectional view.

FIG. 9 shows a cross-sectional view of knock out plug 42 in the plate 10 taken along lines 8-8.

The alignment plate can be made of various materials, such as plastic (thermoplastic or thermoset) composites (such as graphite composites or fiberglass composites), metal (such as stainless steel or aluminum) or wood (such as pine, cedar or wood composites or plywood).

One preferred material is stainless steel in that even when relatively thin it is still strong, is well known and widely used in the industry and is compatible with the bags and holder.

Another is a thermoplastic such as polyethylene, polypropylene, PVDF, PES, and the like. One embodiment is to use a high density polyethylene. Another is a linear low density polyethyelene.

Thermosets such as urethanes or epoxies may be used to form the plate. Composites such as fiberglass or graphite composites are also useful.

Wood is relatively inexpensive and light weight and can be used in the present invention as well. Rot resistant woods such as cedar or various pines are useful. Plywood, chip board, wood laminates and the like are also useful, although they may need a protective coating if they are to be subjected to a wet environment.

In a further alternative embodiment of this invention, one can coat the steel, plastic or wood layer with a thermoplastic layer, a thermoelastomeric layer such as a thermoplastic elastomer (TPE) or an elastomeric layer such as a silicone layer. In one example of this embodiment, the rigid plate is made of steel, preferably stainless steel, which is coated on at least one side and preferably encapsulated in a plastic such as polyethylene or polypropylene, a IPE or a silicone. In another embodiment, the plate is made of a plastic to which silicone adheres such as polysulfones or polyethersulfones. In a further embodiment, the plastic plate can be coated or encapsulated or laminated with another plastic layer or TPE layer. In the same way, a wood plate can also be coated or encapsulated with one of these layers.

The coated layers may provide additional cleanliness to the plate or act as a bonding layer between the plate and the bag to which it is attached if such bonding is desired. It also reduces the potential for flash or rough surfaces on the plate to pierce the adjacent bag.

The plate may in the case of plastics, composites and metals either formed from a blank sheet of material or molded as the finished plate. Wood can be funned from a blank and shaped into the desired configuration and port arrangement.

Additionally, wireless tracking devices such as RFID chips, Zigbee® or Bluetooth® devices may also be included on the plate to provide manufacturing data about the plate, the bag to which it is attached and with devices having read/write capabilities to track the use of the bag at the user's facility. There information relating to a true event such as entry into inventory, use, the material made or stored in the bag, etc can added by the user to the tag.

What is claimed:

1. A system comprising, a holder for a bag, the holder having a sidewall and a bottom, the bottom having an asymmetric shaped opening extending from an interior space of the holder to an exterior space around the holder, a bag having a bottom, one or more sidewalls and a top to form a closed vessel with an interior space, the bag having one or more ports extending from the bottom of the bag and providing a way into or out of the bag, an asymmetric shaped alignment plate corresponding in shape and size to the asymmetric opening of the holder, the alignment plate having one or more holes equal to and in alignment with the one or more ports of the bag and the one or more ports extend through the holes of the alignment plate, the alignment plate being attached to a structure selected, from the group consisting of the bag and the one or more ports, the alignment plate being attached to the structure such that the alignment plate can only be fitted into the opening of the holder in one direction such that the bag is aligned with the holder in one direction.

2. The system of claim 1 wherein the holder opening and the bag alignment plate are both in a form selected from the group consisting of uneven polygons, partial polygon/partial circular designs and two or more rectangular or circular designs of different sizes.

3. The system of claim 1 wherein the alignment plate is attached to the one or more ports by one or more retainers attached on the one or more ports below the alignment plate.

4. The system of claim 1 wherein the alignment plate is attached to the one or more ions by one or more retainers attached on the one or more ports below the alignment plate and the retainers are selected from the group consisting of plastic cable ties, wire ties and tube clamps.

5. The system of claim 1 wherein the bag has one port and the plate has one opening aligned with the port and the bag has a separate attachment feature spaced apart from the one port and the plate has a separate opening aligned with the attachment feature to retain the plate in relative position with the bag and the port.

6. The bag of claim 1 wherein the plate is attached to the one or more ports by a retainer selected from the group consisting of one or more cable ties, wire ties and clamps.

7. The system of claim 1 wherein the plate has one or more openings aligned to match the ports of the bag and the plate is welded an adjacent surface of the bag.

8. The system of claim 1 wherein the plate has one or more openings aligned to match the one or more ports of the bag and the plate is molded to an adjacent surface of the bag.

9. The system of claim 1 wherein the plate has one or more openings aligned to match the one or more ports of the bag and the plate is overloaded to an adjacent surface of the bag.

10. The system of claim 1 further comprising a wireless device attached to the plate wherein the wireless device is a RFD tag.

11. A method of installing a bag into a holder comprising:

a. Providing a holder having a bottom and one or more sidewalls, the bottom having an asymmetric shaped opening extending through from an interior of the holder to an exterior of the holder, b. Providing a bag having a bottom, one or more sidewalk and a top to form a closed vessel with an interior space, the bag having one or more ports extending from the bottom of the bag, an asymmetric shaped alignment plate corresponding in shape and size to the asymmetric opening of the holder, the alignment plate being attached to a structure selected from the group consisting of the bag and the one or more ports, the plate being attached such that the plate is fixed in relationship with the bag, c. inserting the bag into the holder and aligning the plate of the bag with the opening of the holder such that the bag is aligned with the holder in one direction.

* * * * *

UNITED STATES PATENT AND TRADEMARK OFFICE

CERTIFICATE OF CORRECTION

PATENT NO. : 9,187,240 B2
APPLICATION NO. : 14/191499
DATED : November 17, 2015
INVENTOR(S) : Hobson et al.

It is certified that error appears in the above-identified patent and that said Letters Patent is hereby corrected as shown below:

In the claims

Column 6, line 8, claim 4 delete “ions” and insert -- ports --, therefor.

Column 6, line 32, claim 10 delete “RFD” and insert -- RFID --, therefor.

Column 6, line 38, claim 11 delete “sidewalk” and insert -- sidewalls --, therefor.

Signed and Sealed this
Twenty-ninth Day of March, 2016

Michelle K. Lee

Michelle K. Lee
*Director of the United States Patent and Trademark Office*